United States Patent
Bryant et al.

(10) Patent No.: US 6,234,565 B1
(45) Date of Patent: May 22, 2001

(54) DUAL ACTION BIFOLD DOOR ASSEMBLY

(75) Inventors: Wade W Bryant, Grosse Pointe Woods; Dean N Rossman, Romeo; Edmond D Upton, Davisburg, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/480,355

(22) Filed: Jan. 10, 2000

(51) Int. Cl.$^7$ ....................................................... B60J 5/06
(52) U.S. Cl. ................ 296/155; 296/146.11; 296/146.12; 296/146.13; 49/501; 160/199; 160/206; 160/213
(58) Field of Search ........................... 296/146.11, 146.12, 296/146.13, 155; 160/199, 206, 213

(56) References Cited

U.S. PATENT DOCUMENTS

| | | | |
|---|---|---|---|
| 3,554,267 | * | 1/1971 | Brinker .................................. 160/206 |
| 3,695,331 | * | 10/1972 | McClain ................................. 160/213 |
| 3,946,790 | * | 3/1976 | Besse .................................... 160/206 |
| 3,987,837 | * | 10/1976 | Hewson ................................. 160/206 |
| 3,994,330 | * | 11/1976 | Laby ..................................... 160/199 |
| 4,064,590 | * | 12/1977 | Smoth ................................... 160/206 |
| 4,157,846 | * | 6/1979 | Whitcroft .............................. 296/155 |
| 4,224,975 | * | 9/1980 | Uehara .................................. 160/206 |
| 4,276,919 | * | 7/1981 | Walters ................................. 160/206 |
| 4,346,931 | * | 8/1982 | Merkle .................................. 160/206 |
| 5,536,061 | * | 7/1996 | Moore et al. .......................... 296/155 |
| 5,895,089 | * | 4/1999 | Singh et al. ............................ 296/155 |
| 5,992,918 | * | 11/1999 | Gobart et al. ..................... 296/146.13 |

FOREIGN PATENT DOCUMENTS

| | | | |
|---|---|---|---|
| 42 27 411 | * | 8/1992 | (DE) . |
| 2146296 | * | 9/1983 | (GB) . |
| 2 248 649 | * | 4/1992 | (GB) . |
| 59-34922 | * | 2/1984 | (JP) . |
| 2-171319 | * | 7/1990 | (JP) . |
| 2-262422 | * | 10/1990 | (JP) . |

\* cited by examiner

*Primary Examiner*—Joseph D. Pape
*Assistant Examiner*—Kiran B. Patel
(74) *Attorney, Agent, or Firm*—Charles E. Leahy

(57) ABSTRACT

A bifold door assembly includes two foldable door panels disposed in edge adjacent relation in a door closed position and including vertically spaced hinges connected adjacent center edges of the two panels and allowing folding motion of the panels between a longitudinally aligned closed position and alternative forward and rear pivoted side by side laterally extending open positions. Each of the door panels has an upper hinge member adjacent an outer edge of the respective panel and pivotable on carrier movable along a longitudinal upper track from a first position near one end of the track to a second position spaced inward from an opposite end of the track. At least one of the door panels also has a lower hinge member adjacent an outer edge of the respective panel and pivotably connected with carrier movable along a longitudinal lower track from a first position near one end of the track to a second position spaced longitudinally from said one end of the track. The door is capable of opening motion from either side by folding the door panels toward an opposite side by track guided longitudinal motion of the carrier of one of the panels with simultaneous pivoting motion of both panels about their hinge members while the carrier of the other panel remains stationary.

11 Claims, 8 Drawing Sheets

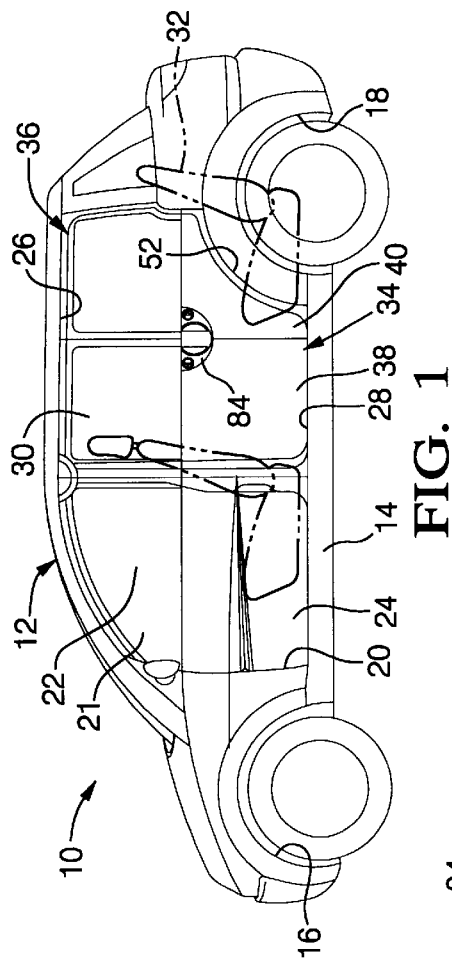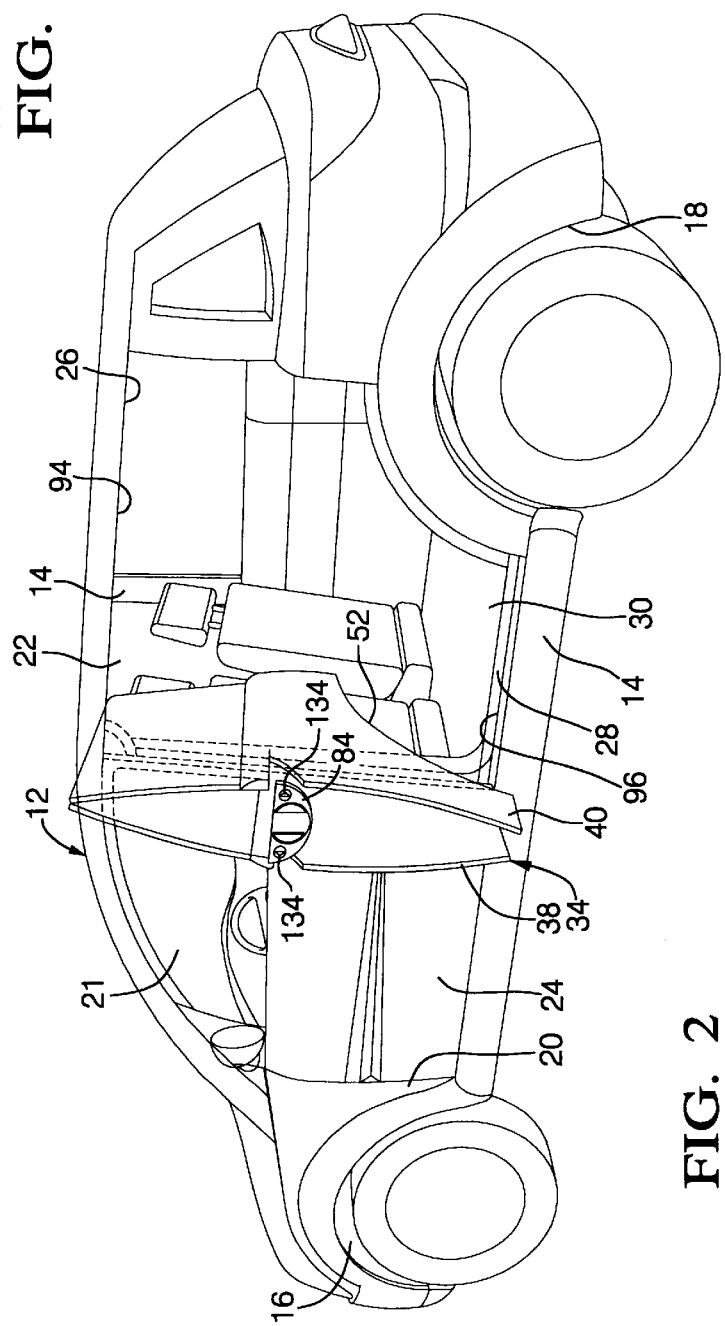

DUAL ACTION BIFOLD DOOR ASSEMBLY

TECHNICAL FIELD

This invention relates to bifold doors especially for use in vehicles but also adaptable to other bifold door applications. A specific embodiment relates to a power actuated dual action bifold side door for accessing the rear compartment of a vehicle from either side of an associated door opening.

BACKGROUND OF THE INVENTION

It is known in the art to provide trucks, vans and other automotive vehicles with sliding or swinging side doors for accessing the rear passenger or cargo carrying portion of the vehicle. Such types of vehicle doors generally open from the forward or aft position of an associated door frame or opening but not generally from both. When a vehicle has a rear compartment usable in either a passenger carrying or cargo carrying mode, the location of seats or the desired positioning of cargo may make it desirable to open the door from either side of the door frame or opening for maximum convenience in loading of the vehicle.

SUMMARY OF THE INVENTION

The present invention solves this and other problems by provision of a dual action bifold door which is pivotable on either side of the door frame and can thus be opened from either side while pivoting around hinge means on the other side. The door includes two panels that are hinged together near their adjacent center edges with their outer edges guided in one or more tracks. Thus with the door fully open, the protrusion from the side of the vehicle, or other application, is limited to the width of one of the panels, or only one half the total width of the door assembly. This allows clearance for full opening of the door even when parked near another vehicle or wall. It also allows entry from either side of the door opening which is most convenient under the particular circumstances. A specific design also accommodates intrusion by the fender well of a vehicle into one of the door panels.

While such a dual action bifold door may be made for completely manual operation, the vehicle application is preferably power operated. In an exemplary embodiment, the two panels are connected together by hinges having spaced pivots and including gear mechanisms to insure equal angular opening and closing motions of the two door panels. The forward panel is preferably hinged on upper and lower pivots supported on carriers movable on upper and lower tracks from the forward edge of the door frame. The rear panel may be hinged from a single upper pivot to allow for a lower edge cutout around an adjacent wheel well. In applications without an intruding wheel well, the rear, or second, panel may also be pivoted on upper and lower hinge pivots carried on dual carriers on the upper and lower tracks.

Rearward door opening motions may be powered by motor driven screws which draw the forward pivots on their tracks toward the rear of the door opening while the rear panel swings outward around its single pivot to open the door from its forward edge. For opening from the rear edge, another motor driven screw may draw the single rear pivot forward along the upper track toward the front of the door opening while the forward panel swings outward about its two forward pivots. In either action, the trailing door panel has one edge drawn outward by the hinges connecting it to the adjacent panel and pivoted on its hinge or hinges which are supported by the screw driven tracked carriers. Suitable clasp and latch means may be provided to draw and/or hold the door panels in a door closed position.

These and other features and advantages of the invention will be more fully understood from the following description of certain specific embodiments of the invention taken together with the accompanying drawings.

BRIEF DESCRIPTION OF THE DRAWINGS

In the drawings:

FIG. 1 is a side view of an automotive vehicle with a dual action bifold rear side door shown in the closed position;

FIG. 2 is a view similar to FIG. 1 but showing the door open toward the front of the opening for loading passengers or cargo;

DESCRIPTION OF THE PREFERRED EMBODIMENT

Figure 3:
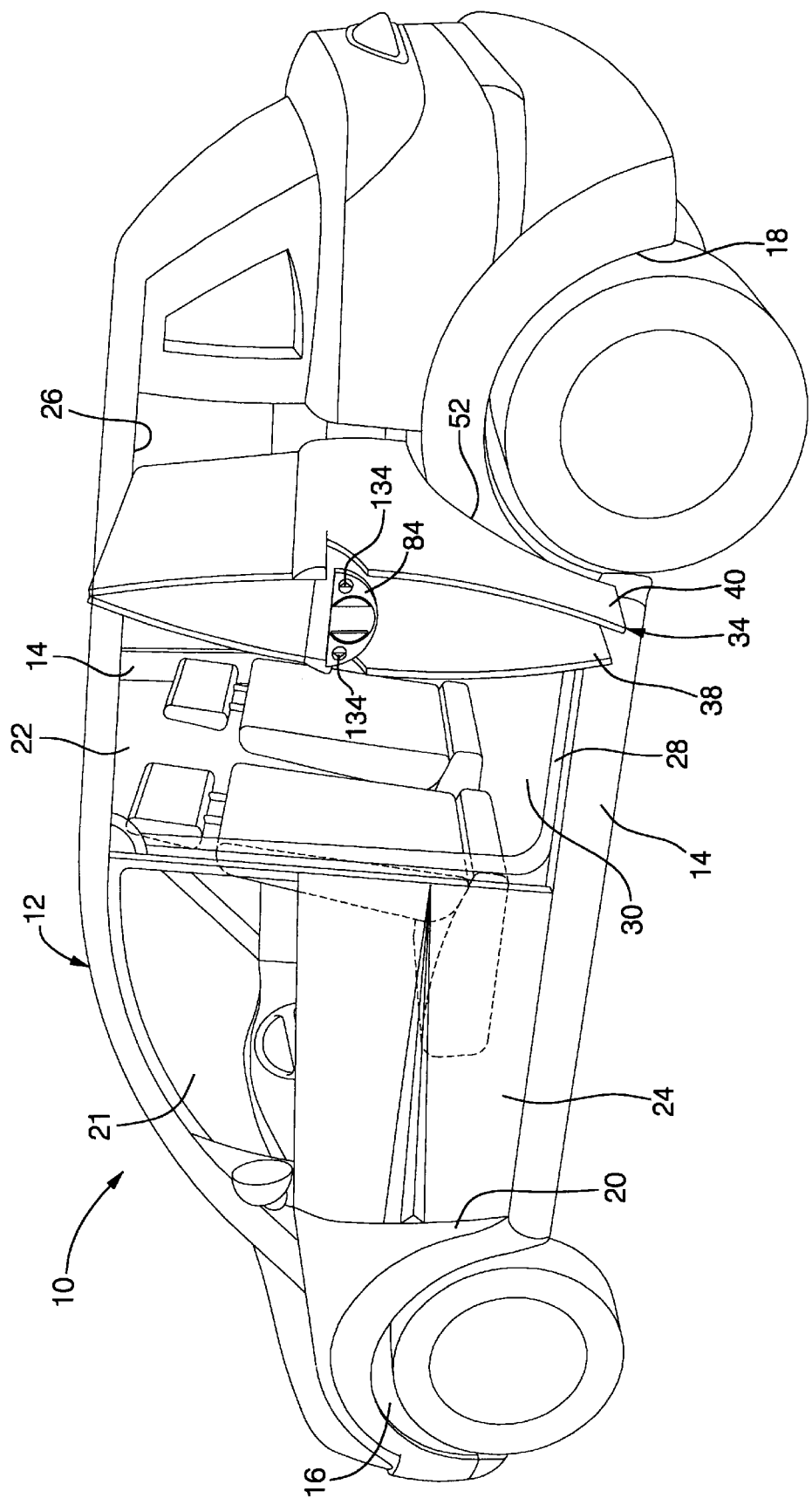
FIG. 3 is a view similar to FIG. 1 but showing the door open toward the rear of the opening for loading passengers or cargo.
Figure 4:
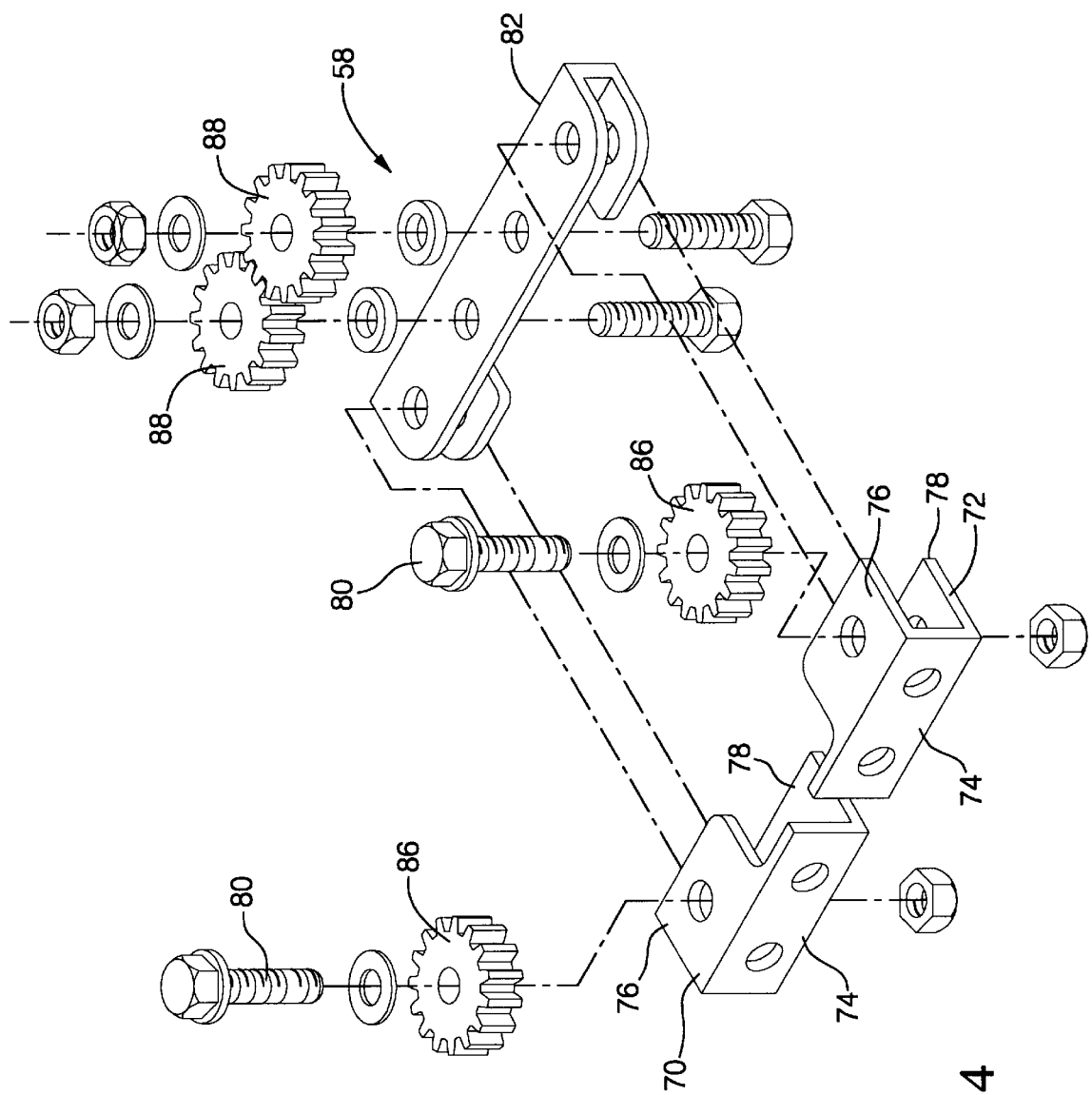
FIG. 4 is an exploded pictorial view of one of the center hinges which pivotally connect the two door panels.
Figure 5:
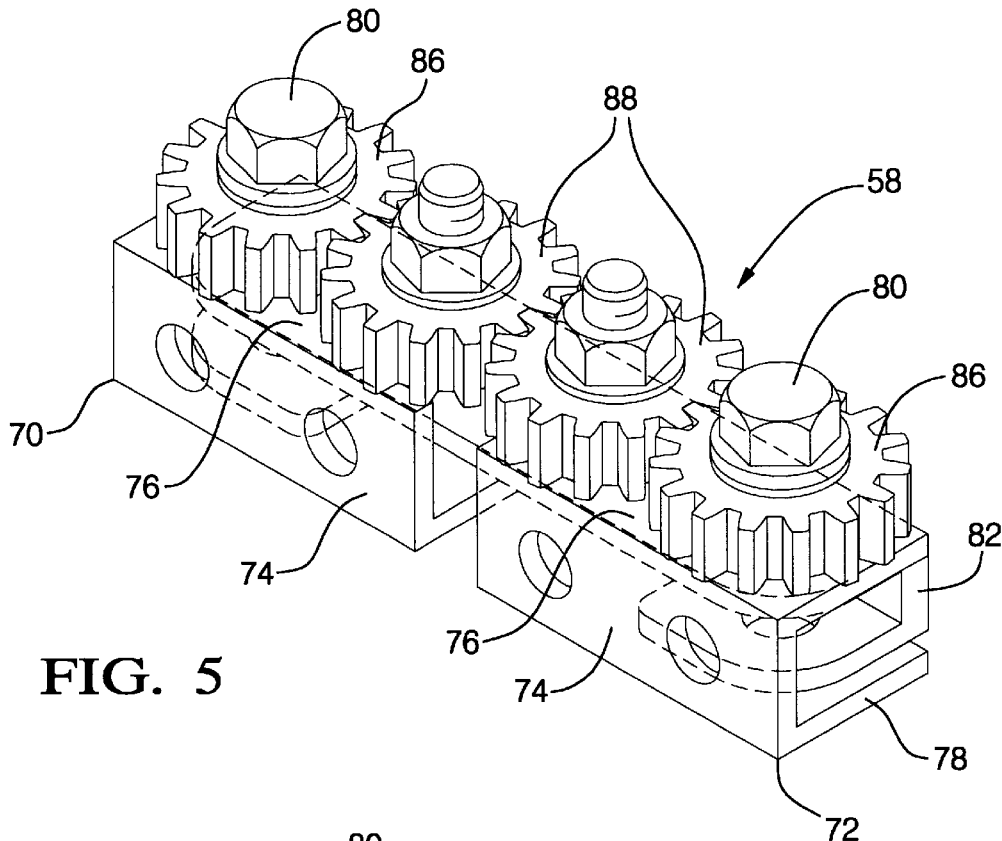
FIG. 5 is a pictorial view of the hinge of FIG. 4 shown in the door closed position.
Figure 6:
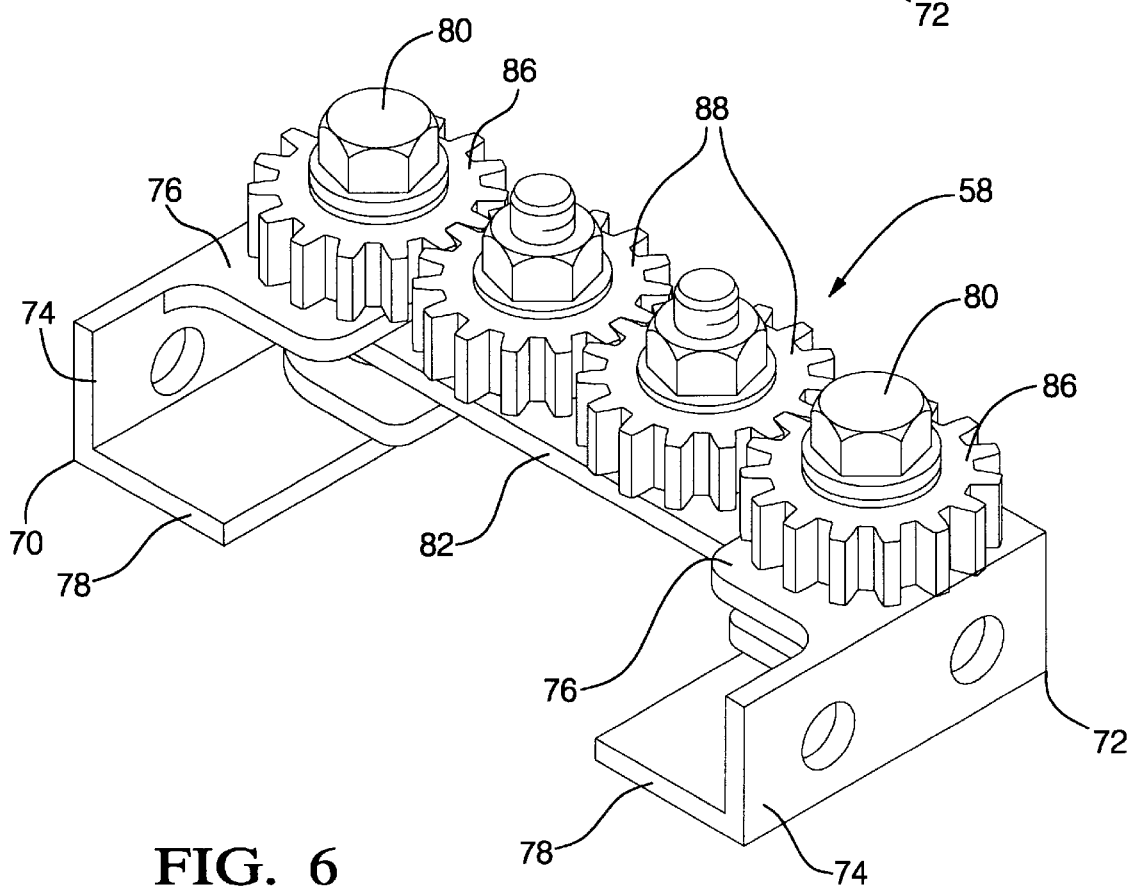
FIG. 6 is a pictorial view of the hinge of FIG. 4 shown in the door open position.

Referring first to FIGS. 1–3 of the drawings in detail, numeral 10 generally indicates an automotive van type vehicle having a body 12 with sides 14 including front and rear wheel wells 16, 18, respectively. On each side 14, between the wheel wells, there is a front door frame 20 defining an opening 21 for entry into a front driver/passenger compartment 22. A conventional front hinged swinging door 24 is mounted on each door frame 20 for controlling access to the front compartment.

Behind the front door frame on at least one side 14 of the vehicle is a rear door frame 26 defining an opening 28 for entry into a rear compartment 30 which is usable for carrying passengers or cargo as desired. The rear compartment 30 may have fixed or foldable rear seats 32 or other equipment for seating passengers or receiving cargo into the compartment. The rear compartment may also extend back into or beyond the area of the rear wheel wells 18. The rear door frame 26 is generally rectangular as viewed from the side but has a concave lower right edge defined by intrusion of the rear wheel well 18 into the area of the opening 28.

Figure 7:
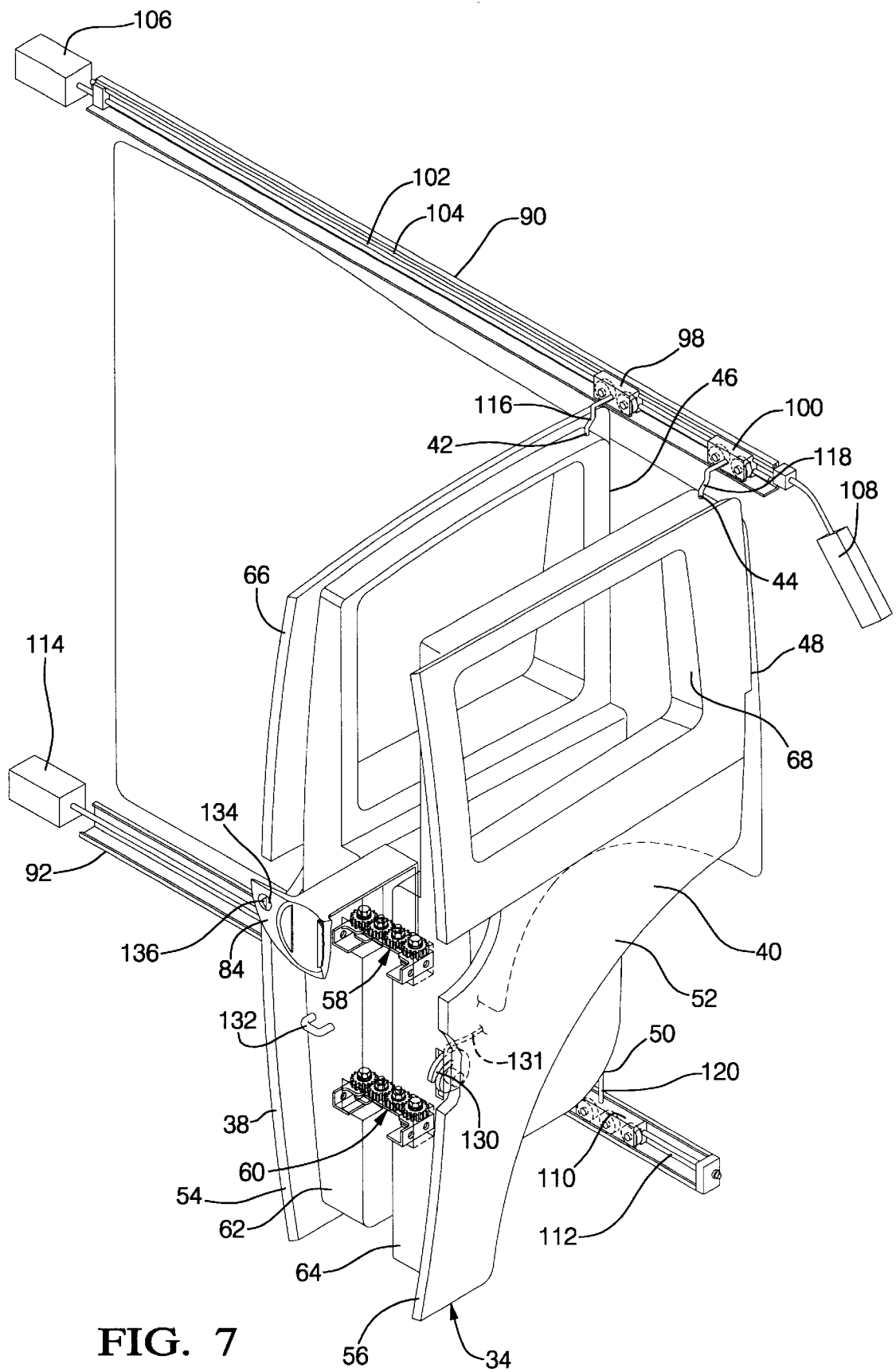
FIG. 7 is a pictorial view showing the door assembly hardware and operating mechanism with the door open toward the rear.
Figure 8:
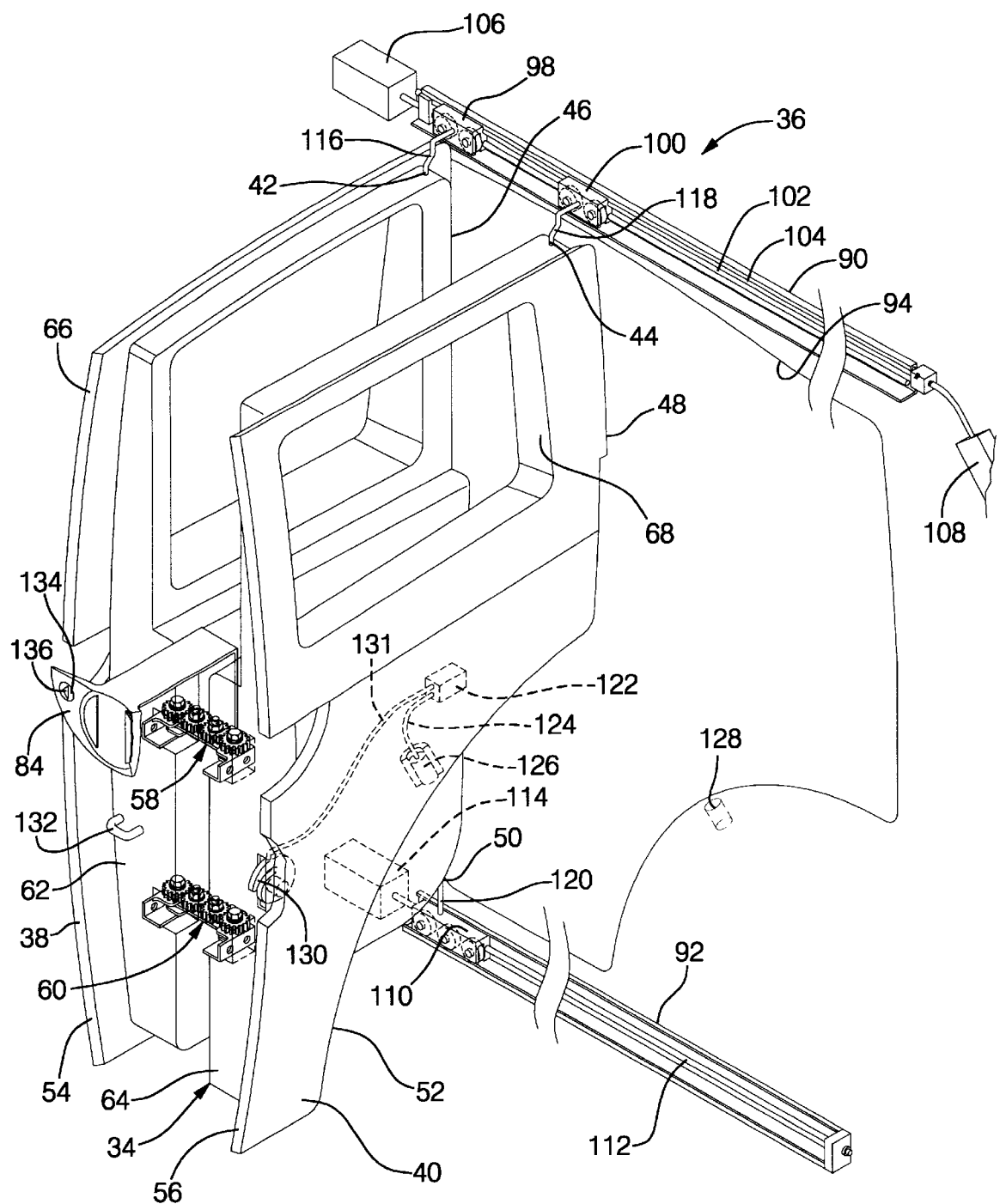
FIG. 8 is a view like FIG. 7 but showing the door open toward the front.
Figure 9:
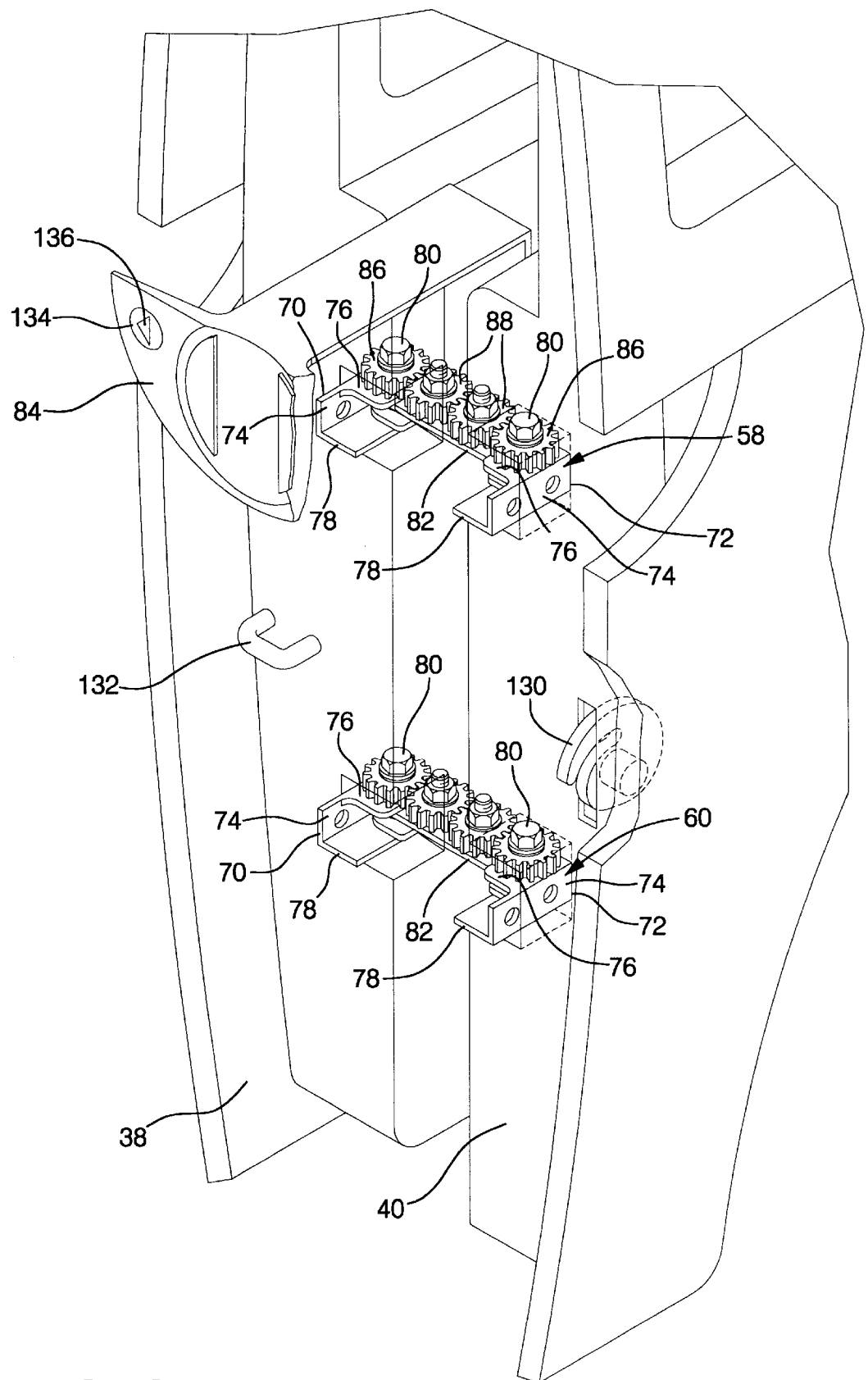
FIG. 9 is an enlarged view of a portion of FIG. 8 showing the center hinge and latch mechanisms for the door.
Figure 10:
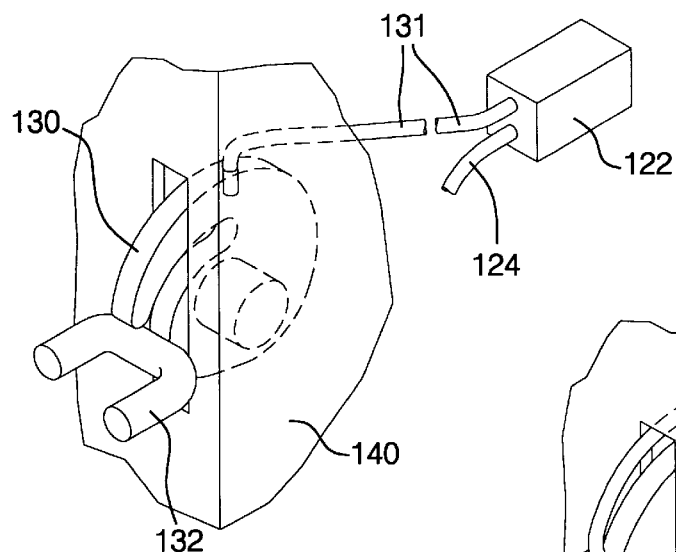
FIGS. 10 and 11 are pictorial views showing respectively the open and closed positions of the latch mechanism for the door.
Figure 11:
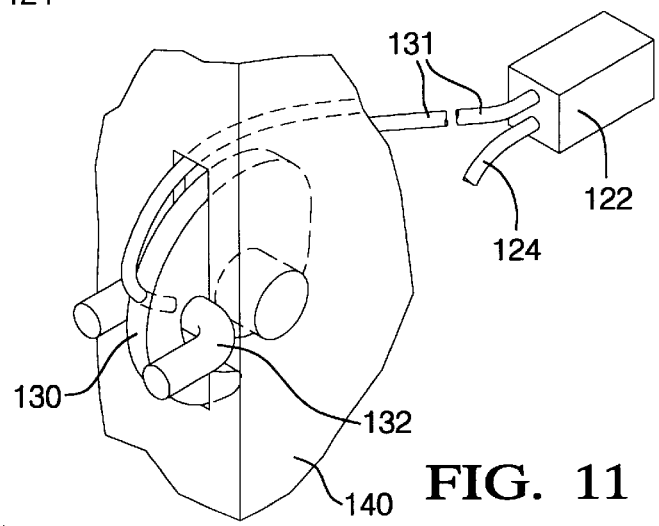
Figure 12:
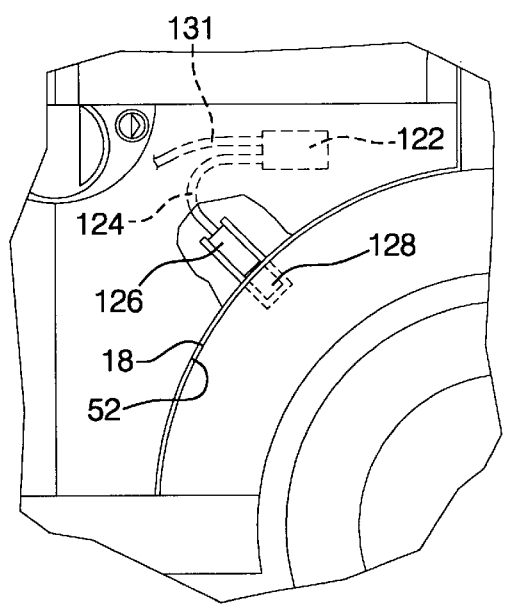
FIGS. 12 and 13 are side views partially broken away to show the rear door panel lock pin mechanism in open and closed positions, respectively.
Figure 13:
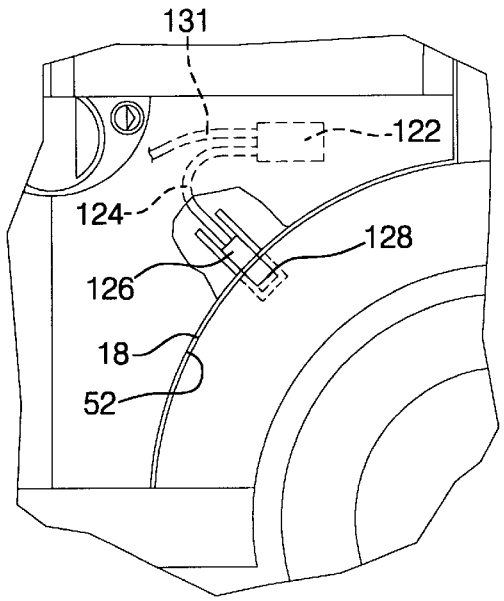

In accordance with the invention, as shown further in FIGS. 7 and 8, the rear door frame 26 mounts a bifold rear door 34 to form a bifold door assembly 36. The bifold door 34 has two panels including a front panel 38 and a rear panel 40. Each of the panels 38, 40 has an upper hinge 42, 44, respectively, mounted adjacent an outer edge of the respective panel. Thus hinge 42 is near the front edge 46 of the front panel 38 and hinge 44 is near the rear edge 48 of the rear panel 40. The front door panel 38 also has a lower hinge 50 mounted adjacent the front outer edge 46 of the front panel. A lower hinge is not provided for the rear panel 40 because of the wheel well cutout 52 in the lower rear edge of the rear panel.

Adjacent center edges 54, 56, the front and rear door panels 38, 40 are connected by upper and lower center hinges 58, 60. The lower hinge 60 is mounted toward the lower center edges of the panels but the upper hinge 58 mounts centrally, near upper edges of lower supporting portions 62, 64 of the panels, the upper portions comprising front and rear side windows 66, 68. If the door panels were essentially flat as might be used in a flat sided truck body or a home closet, the center hinges might be made as relatively simple single pivot hinges. However, the door panels 38, 40 of the illustrated vehicle 10 are curved from top to bottom with a generally upward and inward slope. The lower supporting portions 62, 64 also have internally mounted structure and trim panels which must be kept apart when the panels are folded together.

For these reasons, the center hinges 58, 60, shown in detail in FIGS. 4–6 and 9, each include front and rear mounting members 70, 72 which are configured as U-shaped channels with the center portion 74 of each U formed for attachment adjacent a center edge of one of the connected panels with upper and lower legs 76, 78 of the U channels extending horizontally inward. Each of the mounting members carries a pivot pin 80 extending essentially vertically through its legs 76, 78, the two pivot pins being connected by a hinge link 82 that also serves as a mount for an associated cover and door handle 84. The pivot pins 80 are spaced near opposite ends of the hinge link 82 and far enough apart to provide the needed panel spacing when the door panels 38, 40 are folded together. Each of the pivot pins 80 retains a cog or gear 86 nonrotatably fixed to the upper leg of the associated mounting member 70 or 72. The gears 86 are connected by engagement with a pair of center or idler gears 88 mounted for rotation on the hinge link. The four gears form a train of gears 86, 88, 88, 86 which interconnect the mounting members 70, 72 and their connected door panels 38, 40 and require them to maintain equal angular positions relative to the hinge link 82 and its connected door handle 84.

Referring again to FIGS. 7 and 8, the interconnected door panels 38, 40 are supported and guided on the vehicle body 12 by an upper track 90 and a lower track 92 both extending longitudinally and each mounted on or adjacent an upper or lower edge 94, 96, respectively, of the rear door frame 26. The upper track supports a front carrier 98 and a rear carrier 100, both longitudinally movable on the track. The front carrier 98 moves between a first forward position when the bifold door 34 is closed and a second rearward position that is close to the rear carrier when the door 34 is open toward the rear. The rear carrier 100 moves between a first rearward position when the door 34 is closed to a second forward position when the door 34 is open toward the front. Both carriers 98, 100 are preferably driven by suitable means such as separate drive screws 102, 104, respectively, actuated by suitably positioned individual drive motors 106, 108. The lower track 92 supports only a lower carrier 110 driven by a drive screw 112 actuated by a lower drive motor 114. The lower carrier moves between a first forward position when the bifold door 34 is closed and a second rearward position when the door 34 is open toward the rear. The lower drive motor 114 is synchronized with the front drive motor 106 to drive the lower carrier 110 at the same rate and direction as the upper front carrier 98. Each of the carriers 98, 100, 110 carries a pivot pin 116, 118, 120, respectively, on which the respective door hinges 42, 44, 50 are pivotably mounted for operation to be subsequently described.

Suitable latch means may also be provided to secure the door 34 in the closed position. Any desired form of latch means may be provided as the application may require. The wheel well cutout 52 in the lower rear edge of the rear panel raises a problem because of the lack of a hinge in that location.

While many alternative solutions might be applicable, the present invention uses a pair of latches illustrated in FIGS. 8–13 and actuated together by a linear drive motor 122 similar to a type commonly used to actuate power trunk hold down mechanisms in vehicles. Motor 122 is mounted in the rear door panel 40 and is connected by a cable 124 with a locking pin 126 comprising one of the latches. When the door is closed, pin 126 is driven out from the rear door panel 40 into a mating opening or recess 128 located part way up the curve of the wheel well portion of the door frame 26. This substitutes for the lack of a hinge member in the lower rear corner of the door and secures that corner against lateral movement when the door is closed.

A second latch is mounted near but laterally outside of the upper center hinge 58. The second latch includes an oscillating claw or cam 130 located in the rear door panel 40 and driven by the motor 122 through a cable and/or linkage 131. A slot in the cam engages a pin or bent rod 132 in the front door panel 38 when the door is closed. The motion of the cam 130 draws in the rod 132, thereby drawing outer portions of the door panels closer together relative to the inwardly pivoted center hinges and holding the panels in secure linear alignment. Upon initial opening of the door panels, the cam acts to force the outer panel portions further apart, thus initiating folding of the panels in preparation for driving them in one of two modes of opening motion. Optionally, the cover and door handle 84 may be provided with power door actuating buttons 134 with arrows 136 to indicate the direction of door opening. A central finger grip is also provided to allow manual assistance to the door opening motion or, if provided for, to allow completely manual operation of the door without power assistance. Alternatively, a power door may be remotely actuated by using a transmitter control of a type now common in other vehicle applications but designed to fit the present application.

In operation, the dual action bifold door of the present invention may be opened in either direction, opening from the front toward the rear while pivoting on the rear hinge pivot or opening from the rear toward the front while pivoting on the front hinge pivots. To open the door from either edge, the latch means are first released by actuating the linear motor 122 to draw out the locking pin 126 to release the wheel well latch. Motor simultaneously oscillates the cam 130 to release the rod 132 and urge the center edges of the panels 38, 40 outward.

If opening from the front of the door opening 28 has been selected, the front drive motor 106 and lower drive motor 114 are actuated to rotate screws 102 and 112 in an opening direction. The screws move the front and lower carriers 98, 110 simultaneously rearward on tracks 90, 92 to the fully open rearward position of the door as shown in FIG. 3. To reach this position, the rear panel swings outward about the upper rear pivot pin 118 which remains stationary while the upper and lower front pivot pins 116, 120 are moved rearward with their carriers 98, 110 and the panels 38, 40 are folded together to the rearward open position of the door. While the rear panel is pivoting only about the rear pivot 118, the door continues to be supported by the two front pivots 116, 120 which are moving rearward on the body mounted upper and lower tracks 90, 92 while the front panel is also pivoting outward. During the folding motion, the center hinges act as previously described to maintain the door panels at equal angles relative to the side of the vehicle and to the cover and door handle 84. The latter is maintained parallel to the vehicle side at all times by the action of gear train 86, 88, 88, 86 which interconnects the front and rear door panels 38, 40 with the hinge link 82 on which the door handle 84 is mounted. Closing of the door is accomplished by reversing the action of the drive motors 106, 114 to return the door panels to their closed positions and actuating the linear motor 122 to engage the latches.

When opening from the rear of the door opening 28 is selected, the latches are first released as previously described. Then, the rear drive motor 108 is actuated to rotate screw 104 in an opening direction that moves the rear carrier 100 forward on track 90 to the fully open forward position of the door as shown in FIG. 2. To reach this position, the front panel swings outward about the front pivot pins 116, 120 which remain stationary while the rear pivot pin 118 is moved forward with its carrier 100 and the panels 38, 40 are folded together to the forward open position of the door. During the folding motion, the center hinges act as before to maintain the door panels at equal angles relative to the side of the vehicle and to the cover and door handle 84 which is maintained parallel to the vehicle side at all times by the action of gear train 86, 88, 88, 86. Closing of the door is accomplished by reversing the action of the drive motor 108 to return the door panels to their closed positions and actuating the linear motor 122 to again engage the latches.

It should be apparent that for either manual or power operation of the bifold door, means should be provided to fix the pivot or pivots on one side of the door opening while the door is open or is being opened from the other side. In the power operated door of the illustrated embodiment, this function is performed by the power screw actuators and controls which may be interlocked or sequenced to prevent longitudinal motion of both upper hinges at the same time. Thus, when the door is open in one direction, the drive motor or motors for the stationary pivot(s) cannot be actuated until the door is again closed and the other pivot(s) are thereby returned to their original closed door position(s).

Thus the dual action bifold door of the invention is able to provide flexible access through the side of a vehicle. It can be opened from the front by folding to the rear of its opening or it can be opened from the rear by folding to the front of its opening. Full opening in either direction extends the door laterally only half of its total width while providing a large opening allowing passengers to enter or exit the vehicle easily or for cargo to be loaded or removed in the most convenient way. While power operation is preferred, the door can also be arranged for manual operation if desired. Further, the door can be opened over a rear wheel well while maintaining support from at least three pivots while being opened.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A bifold door assembly comprising:

two foldable door panels disposed in edge adjacent relation in a door closed position and including vertically spaced hinges connected adjacent center edges of the two panels and allowing folding motion of the panels between a longitudinally aligned closed position and alternative forward and rear pivoted side by side laterally extending open positions;

each of the door panels having an upper hinge member adjacent an outer edge of the respective panel and pivotable on carrier means movable along a longitudinal upper track from a first position near one end of the track to a second position spaced inward from an opposite end of the track; and at least one of the door panels having a lower hinge member adjacent an outer edge of the respective panel and pivotably connected with carrier means movable along a longitudinal lower track from a first position near one end of the track to a second position spaced longitudinally from said one end of the track;

whereby the door is capable of opening motion from either side by folding the door panels toward an opposite side by track guided longitudinal motion of the carrier means of one of the panels with simultaneous pivoting motion of both panels about their hinge members while the hinge member of the other panel remains stationary.

2. A bifold door assembly as in claim 1 including means to prevent simultaneous displacement of both upper hinge members from their first positions.

3. A bifold door assembly as in claim 1 including releasable latch means for selectively retaining the panels in the door closed position and releasing the panels for opening motion thereof.

4. A bifold door assembly as in claim 1 including a center hinge connecting the panels adjacent center edges thereof, the center hinge including mechanism requiring both panels to maintain equal pivot angles relative to an associated door frame.

5. A bifold door assembly as in claim 4 wherein the center hinge mechanism includes spaced mounting members, one attached to each of the panels and including spaced pivot pins connecting by a hinge link, outer gears, one fixed to each of the mounting members and pivotable therewith and a pair of idler gears rotatable on the hinge link and engaging one another with each of the idler gears also engaging one of the outer gears to form a gear train that operates to maintain said equal pivot angles of the door panels.

6. A bifold door assembly as in claim 5 including a door handle carried on said hinge link and maintained thereby in constant angular relation with the door frame during opening and closing pivoting motions of the door panels as well as with the door in the open and closed positions.

7. A bifold door assembly as in claim 1 including power means for moving the carrier means along the tracks for opening and closing the door.

8. A bifold door assembly as in claim 7 wherein the power means include drive screws, one engaging each of the carriers and a drive motor drivably connected to each of the drive screws.

9. A bifold door assembly as in claim 1 in combination with a vehicle having a side door frame defining a generally rectangular door opening modified by intrusion of a wheel well into a lower rear corner of the door opening, wherein said lower hinge member is connected adjacent a forward edge of a front one of the panels and a rear one of the panels includes a cutout portion for mating with the wheel well in the door closed position.

10. A bifold door assembly as in claim 9 including releasable latch means for selectively retaining the panels in the door closed position and releasing the panels for opening motion thereof, said latch means including a drive motor connected to actuate a locking pin to extend from the rear door panel into engagement with a recess in the wheel well to hold the lower rear corner of the rear door panel against the wheel well in the door closed position.

11. A bifold door assembly as in claim 10 wherein the drive motor also actuates a mechanism that pulls the center edges of the panels closer together upon closing of the door to force the panels into longitudinal alignment in the door closed position.

* * * * *